(12) United States Patent
Cabouillet et al.

(10) Patent No.: US 12,090,903 B2
(45) Date of Patent: Sep. 17, 2024

(54) SEAT SUPPORT ELEMENT, SEAT AND ASSOCIATED MANUFACTURING METHOD

(71) Applicant: Faurecia Sièges d'Automobile, Nanterre (FR)

(72) Inventors: Anne Sophie Cabouillet, Boissy-le-Sec (FR); Benoit Scheer, Bagneux (FR); Anthony Maire, Montbeliard (FR)

(73) Assignee: Faurecia Sièges d'Automobile, Nanterre (FR)

( * ) Notice: Subject to any disclaimer, the term of this patent is extended or adjusted under 35 U.S.C. 154(b) by 58 days.

(21) Appl. No.: 17/515,183

(22) Filed: Oct. 29, 2021

(65) Prior Publication Data

US 2022/0134925 A1 May 5, 2022

(30) Foreign Application Priority Data

Oct. 29, 2020 (FR) .................. FR 20 11095

(51) Int. Cl.
*B60N 2/70* (2006.01)
*B29C 43/00* (2006.01)
*B29K 105/04* (2006.01)
*B29K 267/00* (2006.01)
*B29L 31/00* (2006.01)

(52) U.S. Cl.
CPC .......... *B60N 2/7017* (2013.01); *B29C 43/003* (2013.01); *B29K 2105/04* (2013.01); *B29K 2267/003* (2013.01); *B29L 2031/771* (2013.01)

(58) Field of Classification Search
CPC ............... B60N 2/7017; B29C 43/003; B29K 2105/04; B29K 2267/003; B29L 2031/771
USPC ........................................ 297/452.48
See application file for complete search history.

(56) References Cited

U.S. PATENT DOCUMENTS

| 5,482,665 A | * | 1/1996 | Gill ........................ D04H 1/558 264/122 |
| 2006/0278322 A1 | * | 12/2006 | Piatkowski ........... B29C 35/049 264/122 |
| 2011/0169320 A1 | | 7/2011 | Koeppe et al. |
| 2019/0039486 A1 | * | 2/2019 | Wright ..................... B60N 2/66 |

FOREIGN PATENT DOCUMENTS

DE 102008035622 A1 10/2009
WO WO2007114233 * 10/2007

OTHER PUBLICATIONS

French Search Report corresponding to French Application No. FR 2011095, dated Jul. 20, 2021, 2 pages.

* cited by examiner

*Primary Examiner* — Mark R Wendell
(74) *Attorney, Agent, or Firm* — Reising Ethington P.C.

(57) ABSTRACT

A seat support element has a body that includes at least one portion having a plurality of discrete structural elements and a plurality of connecting fibers, the discrete structural elements being joined together via the connecting fibers to form the portion of the body.

20 Claims, 3 Drawing Sheets

SEAT SUPPORT ELEMENT, SEAT AND ASSOCIATED MANUFACTURING METHOD

TECHNICAL FIELD

The present invention relates to a support element for a seat of a vehicle, comprising a body.

The body is intended to support a seat user, for example.

BACKGROUND

It is known from the state of the art that seat support elements have a body made from raw materials, for example, from natural resources. For example, the body is made of organic, mineral or synthetic materials.

For example, the body is produced by expansion molding of a foam precursor material such as thermosetting foam, into a mold cavity having the shape of the body to be produced. To reinforce the body, it is also known to add reinforcing fibers, such as glass fibers, to the foam forming the body.

However, it is then complex to ensure a good cohesion of the body while modulating the reinforcement with precision.

SUMMARY

One object of the invention is to overcome this drawback by providing a seat support element whose cohesion is ensured in a simple manner, whose body reinforcement is better controlled and whose manufacture is simple.

To this end, the invention relates to a support element for a seat of a vehicle of the aforementioned type, the body comprising at least one portion comprising a plurality of discrete structural elements and a plurality of bonding fibers, the discrete structural elements being joined together via the bonding fibers to form the portion of the body.

The use of discrete structural elements to form the body portion of the support element makes it possible to avoid the need for conventional casting of a foam precursor material into a mold cavity. The mixing of the discrete structural elements and the bonding fibers is easier and allows for simpler and more precise modulation of the body reinforcement while ensuring good cohesion of the body.

In addition, the discrete structural elements can be sourced from a variety of sources, which increases the options for manufacturing the support element. For example, this avoids the use of foam precursor material from natural resources.

According to other optional features of the invention, taken alone or in any technically feasible combination:
 the discrete structural elements are formed by a structural material made of foam and/or structural fiber and/or textile;
 the bonding fibers comprise a central core and a sheath covering the core, the sheath being made of a material that melts when subjected to a melting temperature;
 the sheath comprises at least one securing portion attached to at least one discrete structural element and/or at least one other bonding fiber;
 the structural fibers are formed by a bare core, the bare core not melting when subjected to the melting temperature;
 the bonding fibers and/or the structural fibers are thermoplastic fibers, in particular fibers made of polyethylene;
 the bonding and/or structural fibers are thermoplastic fibers, in particular fibers made of polyethylene terephthalate;
 the discrete structural elements are formed by the structural material that is cut and ground;
 the body is formed entirely of discrete structural elements and bonding fibers;
 the support element further comprises a frame, the body being connected to the frame, and at least one protective layer for protecting the body extending between the body and the frame; and
 the body defining a bearing surface, the seat support element further comprising a comfort layer extending over the bearing surface and being intended to be interposed between a user of the seat and the bearing surface.

The invention also relates to a vehicle seat of the type comprising a support element as described above, the support element being a seat cushion, a backrest or a headrest of the seat.

The invention further relates to a method for manufacturing a seat support element as described above, optionally having one or more of the optional features described above.

According to one embodiment of the method, the support element comprises a body, the body comprising at least a portion comprising a plurality of discrete structural elements and a plurality of bonding fibers, the method comprising the steps of:
 providing the discrete structural elements and the bonding fibers,
 mixing the discrete structural elements and the bonding fibers to form a manufacturing assembly,
 shaping the manufacturing assembly so that it takes the shape of at least a portion of the body, and
 securing the discrete structural elements together via the bonding fibers.

According to other optional features of the method, taken alone or in any technically feasible combination:
 the discrete structural elements are formed by a structural material made of foam and/or structural fibers and/or textile, wherein the bonding fibers and/or structural fibers are thermoplastic fibers, in particular fibers made of polyethylene terephthalate; and
 the bonding fibers comprise a central core and a sheath covering the core, the sheath being made of a material that melts when subjected to a melting temperature, the securing step comprising arranging the manufacturing assembly in a mold, the securing step comprising the sub-steps of:
 pressing the manufacturing assembly into the mold,
 heating the manufacturing assembly in the mold to the melting temperature to melt the bonding fiber sheath at least partially, and
 cooling the manufacturing assembly so that the discrete structural elements are secured to each other via the bonding fibers.

BRIEF DESCRIPTION OF THE DRAWINGS

Further aspects and advantages of the invention will become apparent from the following description, given by way of example and made with reference to the appended drawings, in which.

DETAILED DESCRIPTION

Figure 1:
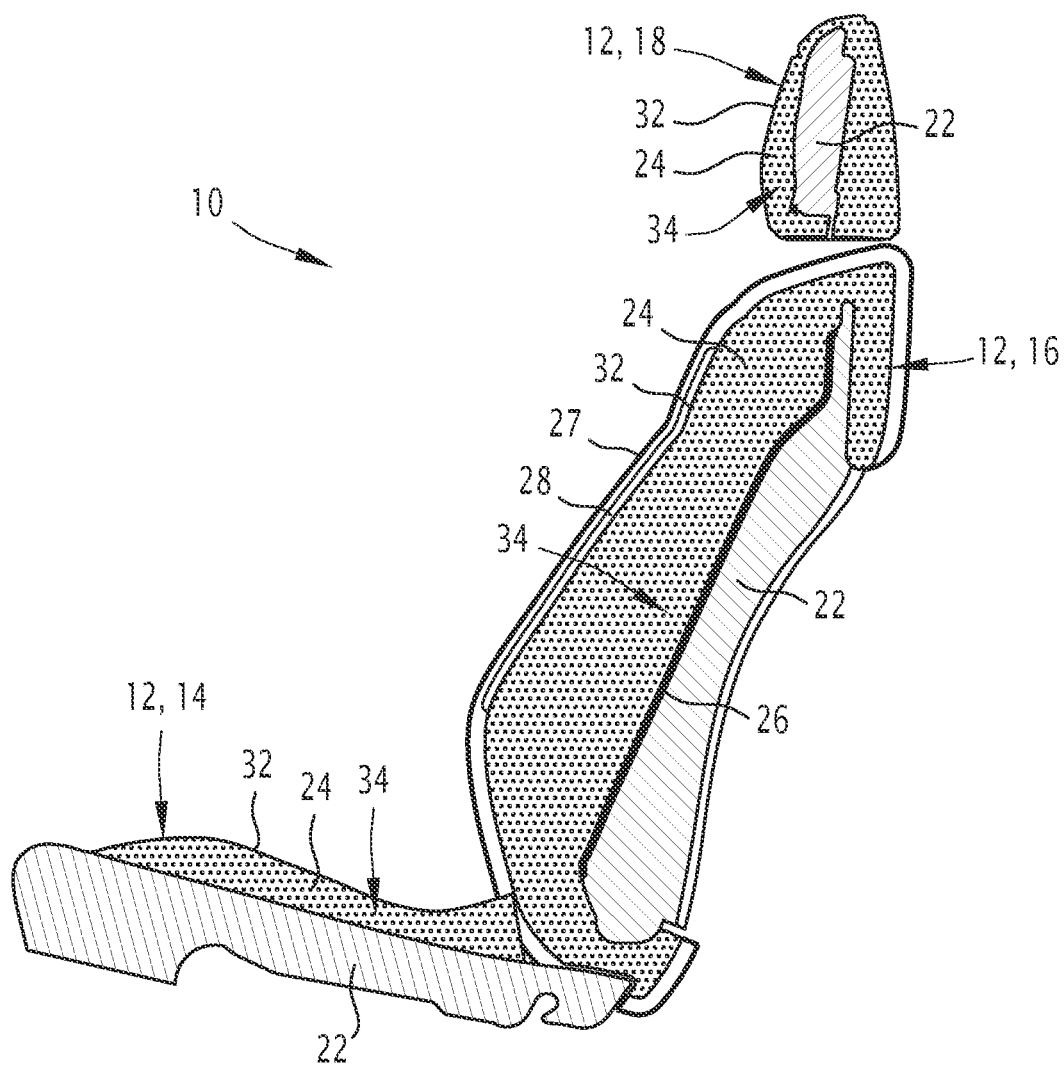
FIG. 1 is a schematic cross-sectional representation of a vehicle seat according to an embodiment of the invention.

With reference to FIG. 1, a vehicle seat 10 is described. For example, the seat 10 is a seat of a land, sea or air vehicle. The seat 10 is a seat of a motor vehicle, for example.

The seat 10 is intended to receive a user of the seat 10.

The seat 10 comprises at least one support element 12, intended for supporting the user's body.

The seat 10 comprises a plurality of support elements 12, for example.

The support element 12 forms a seat cushion 14, a backrest 16, or a headrest 18 of the seat 10, for example. It is understood that a single seat 10 may include multiple support elements 12.

The support element 12 comprises a frame 22 and a body 24 connected to the frame 22.

The frame 22 constitutes a framework of the support element 12, to which, for example, the body 24 is attached.

The frames 22 of each support element 12 are connected to each other, for example. The set of frames 22 then constitutes a framework of the seat 10.

The frames 22 are also connected to a (non-illustrated) floor of the vehicle, for example. For example, the frame 22 of the seat 14 is fixed to the floor of the vehicle, for example, by means of rails (not illustrated), allowing for adjustment of the position of the seat 10 in the vehicle.

The body 24 of the support element 12 is a support for the user. The user's body is supported on the body 24 when the user uses the seat 10. In particular, the body 24 defines a bearing surface 32. The user is supported by the body 24 at the bearing surface 32.

The body 24 is a molded body. It is attached to the frame 22 by a securing means.

Figure 2:
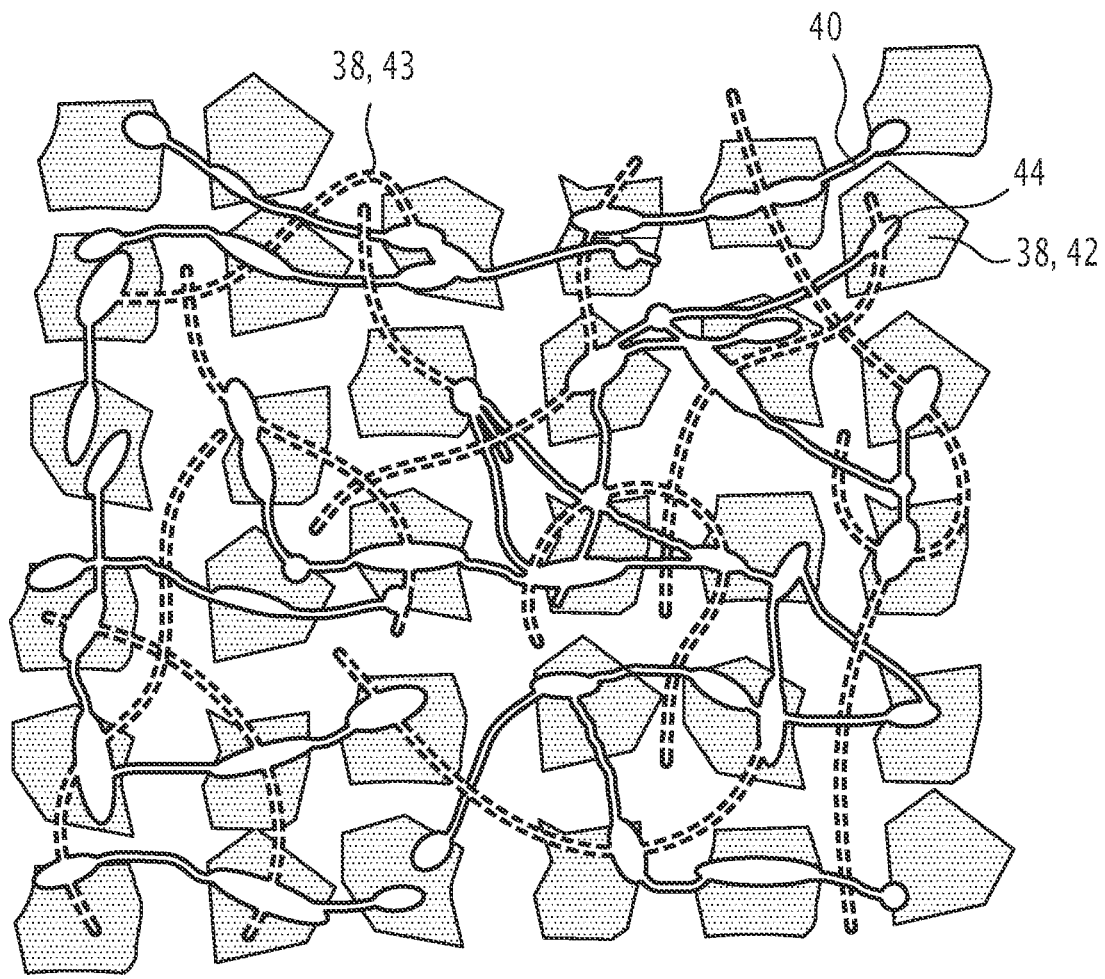
FIG. 2 is a simplified schematic representation of the structure made by the discrete structural elements and the bonding fibers of a seat support element according to an embodiment of the invention.

With reference to FIGS. 1 and 2, the body 24 comprises at least one portion 34 comprising a plurality of discrete structural elements 38 and a plurality of bonding fibers 40.

For example, the discrete structural elements 38 are formed by a structural material made of foam and/or structural fibers and/or textile.

For example, the discrete structural elements 38 are formed by a structural material of a mixture of foam and structural fibers or a mixture of foam and textile or a mixture of structural fibers and textile or a mixture of foam, structural fibers and textile. The discrete structural elements 38 are formed by the structural material that is cut and crushed, for example.

For example, the structural material is a material obtained from an object made of foam and/or structural fibers and/or textile. The structural material is then said to be obtained by recycling said object. This reduces the environmental impact of the support element 12 since the structural material is not obtained from raw resources taken from the environment.

In a variant or additionally, the structural material is derived from material discarded during the production of an object made of foam and/or structural fibers and/or textile, for example. The material is then derived from excess material during the manufacture of the object. This also reduces the environmental impact of the support element 12. This is because the use of surplus material reduces the waste of resources. In addition, the use of the surplus contributes to the reduction of carbon dioxide emissions into the atmosphere, since incinerating said surplus is thus avoided.

Moreover, the use of the surplus contributes to the reduction of soil pollution, since it is avoided to bury the said surplus.

The foam of the structural material is a polyurethane (PU) foam, for example. The structural fibers of the structural material are plastic fibers such as polyethylene terephthalate (PET) fibers, for example. The textile of the structural material is a simple textile, for example, also known as a bare textile, such as a non-woven fabric or a complex textile, such as a laminated textile that comprises a textile layer and a foam layer, for example.

As illustrated in FIG. 2, the discrete structural elements 38 are in the form of flakes 42 of material or granules of material in the body 24, for example. Such a flake of material then constitutes a discrete structural element 38 within the meaning of the invention. Such a material flake 42 is formed in particular by foam and/or textile and/or a mixture of foam and textile. The flakes 42 have a dimension of between 5 mm and 50 mm, for example. This dimension is the average diameter of the flake 42, for example, or its dimension along its direction of elongation for an elongated element or other.

As illustrated in FIG. 2, the discrete structural elements 38 are strands 43, for example. Such a strand 43 then constitutes a discrete structural element 38 within the meaning of the invention. Such a strand 43 is a structural fiber as described above, in particular. The strands 43 have a dimension of between 30 mm and 120 mm, for example. This dimension is the dimension of a strand 43 along its direction of elongation, for example. The strands 43 have a count of between 6 dtex and 17 dtex, for example.

The proportion of discrete structural elements 38 constitutes between 50% and 90% by weight of the portion 34 of the body 24, for example, preferably between 55% and 85% by weight. The proportion of bonding fibers 40 constitutes between 10% and 50% by mass of the portion 34 of the body 24, for example, preferably between 15% and 45% by mass.

According to one embodiment, the proportion of discrete structural elements 38 varies from one part 34 of the body 24 to another.

The discrete structural elements 38 participate in the reinforcing of the body 24. In particular, by varying the proportion of discrete structural elements 38 and, further, by varying the composition of the discrete structural elements 38, the reinforcement of the body 24 can be precisely modulated. "Varying the composition" means varying the composition of the structural material by varying the proportions of foam and/or proportions of structural fibers and/or proportions of textile.

As illustrated in FIG. 2, the discrete structural elements 38 are joined together by means of the bonding fibers 40 to form the portion 34 of the body 24.

The bonding fibers 40 are thermoplastic fibers, for example.

In particular, the bonding fibers 40 are dual component fibers, for example. They comprise a central core and a sheath covering the central core.

The bonding fibers 40 are made of at least two polymers having different characteristics, for example. The core is made of a first polymer and the sheath is made of a second polymer, for example. The first and second polymers are the same polymer but with different characteristics (same chemical formula, but different physicochemical characteristics), for example. According to a variant, the first and second polymers are different polymers (different chemical formulas). For example, the first polymer is a polyester and the second polymer is a co-polyester. According to another example, the first polymer is a polyamide and the second polymer is a co-polyamide.

In particular, the sheath is made of a material that melts when subjected to a melting temperature. In other words, the second polymer has a melting temperature substantially equal to the melting temperature. The melting temperature is between 70° C. and 200° C., for example.

As illustrated in FIG. 2, the sheath of bonding fibers 40 comprises at least one securing portion 44, attached to at least one discrete structural element 38 and/or at least one other bonding fiber 40.

The bonding fibers 40 are attached to a discrete structural element 38 and/or another bonding fiber 40 via the securing portions 44.

In other words, the bonding fibers 40 act as an adhesive between the discrete structural elements 38. The sheath has melted and re-solidified to ensure the securing with the discrete structural elements 38 and/or the other bonding fibers 40. In particular, the securing portions 44 have melted and re-solidified to ensure this securing.

In addition to securing the discrete structural elements 38 together, the bonding fibers 40 reinforce the body 24. They thus ensure a good cohesion of the part 34 of the body 24 and improve its mechanical properties.

The reinforcement of the body 24 is thus precisely modulated by varying, in addition, the proportions of bonding fibers 40 in relation to the proportion of discrete structural elements 38.

The bonding fibers 40 and the structural fibers are thermoplastic fibers, for example. According to one example, the bonding fibers 40 and the structural fibers are fibers made of polyethylene. In a variant, the bonding fibers 40 and the structural fibers are fibers made of polyethylene terephthalate.

Unlike the bonding fibers 40, the structural fibers that make up the strands 43 comprise a core, but lack a sheath covering said core. In other words, the structural fibers are formed by a bare core. The bare core does not melt when subjected to the melting temperature.

The portion 34 of the body 24 comprising the discrete structural elements 38 and the bonding fibers 40 is a portion in direct contact with the frame 22, for example. The portion 34 of the body 24 may be overmolded by another portion of the body 24, for example, made in a conventional manner, for example, with a conventional thermosetting foam. This conventional foam portion forms at least a portion of the bearing surface 32 of the support element, for example, which a user bears on when sitting in the seat.

According to one embodiment, the support element 12 comprises a protective layer 26 extending between the body 24 and the frame 22. With reference to FIG. 1, only the backrest 16 comprises a protective layer 26. According to another example, the seat cushion 14 also comprises a protective layer 26.

For example, the protective layer 26 is formed by a textile such as a non-woven fabric. According to a variant, the protective layer 26 comprises discrete structural elements 38 and bonding fibers 40, like the portion 34 of the body 24.

The protective layer 26 is attached to the body 24. For example, the protective layer 26 is glued to the body 24.

The protective layer 26 protects the body 24 from abrasion due to contact with the frame 22. In other words, the protective layer 26 reduces wear on the body 24 over time. In addition, the protective layer 26 reduces the noise generated by the body 24 rubbing against the frame 22. The protective layer 26 is attached to the frame 22 by the fastening means attaching the frame 22 and the body 24.

According to one embodiment that can be combined with the embodiment in which the support element 12 comprises a protective layer 26, the support element 12 further comprises a comfort layer 28 extending over at least a portion of the bearing surface 32. The comfort layer 28 is intended to be interposed between the user of the seat 10 and the bearing surface 32. In other words, the comfort layer 28 covers the body 24 at least over a portion of the support surface 32 thereof. The comfort layer 28 ensures the approach comfort and contact comfort of the support element 12. In particular, the comfort layer 28 determines the sensation upon touching of the user of the seat 10, when the user uses the seat 10.

With reference to FIG. 1, only the backrest 16 comprises a comfort layer 28. According to another example, the seat cushion 14 and/or the headrest 18 comprises a comfort layer 28.

The comfort layer 28 extends over at least a portion of the body 24.

The body 24 is overmolded on the comfort layer 28, for example. For example, the comfort layer 28 is made of discrete structural elements 38 and bonding fibers 40 and/or a textile, for example, consisting of PET with comfort-enabling mechanical properties and/or PU foam and/or structural fibers.

When the comfort layer 28 is made of the same material as the body 24, this facilitates recycling of the support element 12.

According to one embodiment that may be combined with the embodiment in which the support element 12 comprises a protective layer 26 and/or the embodiment in which the support element 12 comprises a comfort layer 28, the support element 12 further comprises a covering 27 covering at least a portion of the body 24.

The covering 27 extends at least partially over the body 24 opposite the frame 22 facing the protective layer 26, for example. The covering 27 provides the aesthetic appearance of the support element 12. In addition, the covering 27 constitutes the fastening means securing the body 24 and the frame 22 together, for example. The covering 27 surrounds the body 24, for example, and at least partially surrounds the frame 22 and secures them together. For example, the covering 27 comprises parts for securing to the frame 22, for example. The securing part are parts made of plastic, for example.

The body 24 is overmolded on at least a portion of the covering 27, for example. According to a particular embodiment, the body 24 is overmolded on the entire covering 27.

When the support element 12 comprises a comfort layer 28, the comfort layer 28 is glued to the covering 27.

The covering 27 is made of a covering material.

The structural material, the covering material and the bonding fibers 40 are formed by at least one compound in common, for example. The compound in common is polyethylene, for example. According to a variant, the compound in common is polyethylene terephthalate.

According to one particular embodiment, the structural material and the bonding fibers are solely composed of the compound in common.

The support element 12 further comprises a securing layer (not shown), for example. The securing layer extends between the body 24 and the covering 27 and/or between the body 24 and the comfort layer 28. The securing layer secures the body 24 and the covering 27 together and/or the body 24 and the comfort layer 28 together. For example, the securing layer is a thermally activated securing layer. In other words, the securing layer permanently attaches the body 24 and the covering 27 or the body 24 and the comfort layer 28 when the temperature of the securing layer reaches an activation temperature. The activation temperature is between 70° C. and 200° C., for example. Advantageously, the activation temperature is substantially equal to the melting temperature.

With reference to FIG. 1, only the backrest 16 comprises a covering 27. According to another example, the seat cushion 14 and/or the headrest 18 comprise a covering 27.

According to one particular example, the discrete structural elements 38 are formed by a PET structure fibers material only, the bonding fibers 40 are formed by PET for the first polymer and co-polyethylene terephthalate (coPET) for the second polymer. If applicable, the covering 27 is made of PET. If applicable, the comfort layer 28 is made of PET. In this way, all of the elements constituting the support element comprise PET. The potential recycling of the support element 12 is thus facilitated. One can indeed envisage chemical recycling, mechanical recycling (fraying and/or crushing) and/or thermomechanical recycling (melting) of the support element 12.

Figure 3:
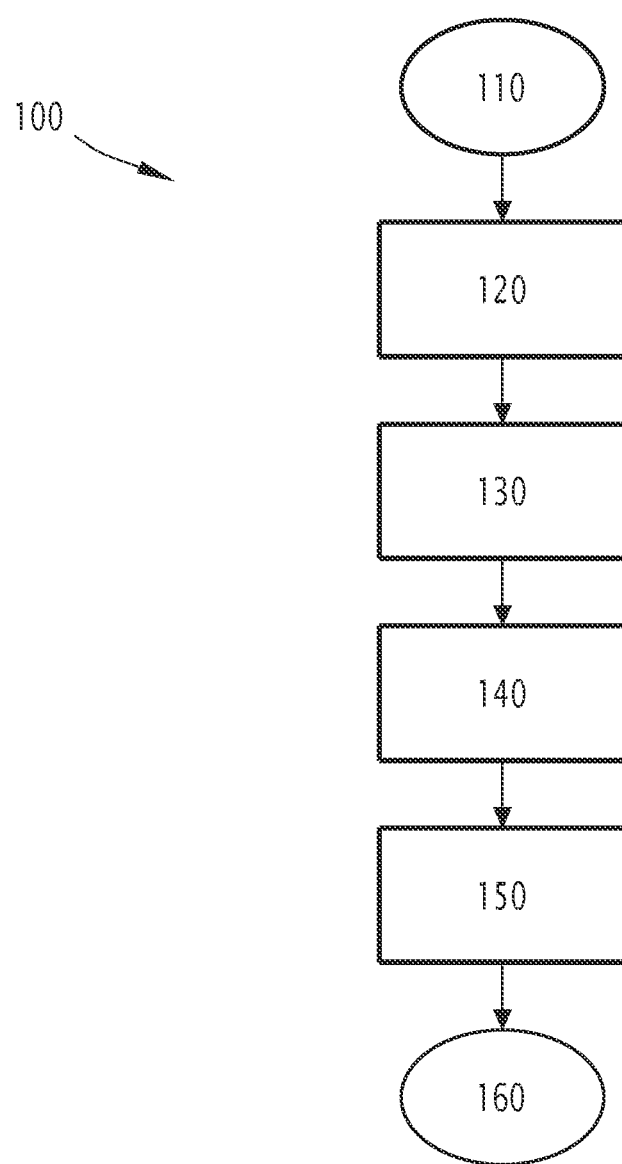
FIG. 3 is a flow chart of a method for manufacturing a seat support element, according to an embodiment of the invention.

In the following, with reference to FIG. 3, a method 100 for manufacturing a support element 12 as described above is described, according to the various embodiments, examples and variants described.

In a first step 110, a plurality of discrete structural elements 38 and a plurality of bonding fibers 40 are provided.

This first step 110 comprises, cutting and crushing the structural material, for example. In particular, for example, it involves cutting and crushing a seat support element considered to be waste. According to another example or additionally, it involves cutting and crushing waste material during the production of an object.

In a second step 120, the discrete structural elements 38 and the bonding fibers 40 are mixed to form a manufacturing assembly.

The method 100 then comprises a third step 130 of shaping the manufacturing assembly so that it takes the shape of at least the portion 34 of the body 24. The shaping comprises placing the manufacturing assembly in a mold cavity of a mold. The mold cavity of the mold has the shape of the portion 34 of the body 24 to be made. The placing of the manufacturing assembly is performed by blowing the manufacturing assembly into the mold, for example. The placing of the manufacturing assembly in the mold is followed, for example, by blowing air into the mold to disperse and mix the manufacturing assembly in the mold.

If applicable, prior to blowing the manufacturing assembly into the mold, the covering 27 is provided and placed in the mold for manufacturing the support element 12. The manufacturing assembly is then blown into the mold over the covering 27 so that the body 24 is subsequently overmolded on the covering 27.

If applicable, prior to blowing the manufacturing assembly into the mold, the comfort layer 28 is glued to the covering 27 in the mold. The manufacturing assembly is then blown into the mold over the comfort layer 28 so that the body 24 is overmolded on the comfort layer 28 and the covering 27.

The method 100 then comprises securing the discrete structural elements 38 to each other via the bonding fibers 40.

Bonding the discrete structural elements 38 together via the bonding fibers includes a fourth step 140, a fifth step 150 and a sixth step 160. The fourth, fifth, and sixth steps 140, 150, 160 constitute sub-steps of securing the discrete structural elements 38 together.

In the fourth step 140, the manufacturing assembly 140 is pressed into the mold. If applicable, the manufacturing assembly 140 and the covering 27 are pressed into the mold.

In the fifth step 150, the manufacturing assembly is heated in the mold at the melting temperature to melt the bonding fibers 40 at least partially, in particular to melt the sheath of the bonding fibers 40 at least partially. In particular, the securing portions 44 of the bonding fibers 40 between said fibers and discrete structural elements 38 and/or other fibers melt, at least partially, to provide securing between the bonding fibers 40 and the discrete structural elements 38. If applicable, the manufacturing assembly and the covering 27 are heated in the mold. If applicable, the securing layer is then thermally activated and the securing layer secures the body 24 and the covering 27.

In the sixth step 160, the manufacturing assembly, if applicable the manufacturing assembly and the covering 27, is cooled so that the discrete structural elements 38 are bonded together via the bonding fibers 40. The previously melted sheath solidifies again to ensure the securing of the discrete structural elements 38 and/or the other bonding fibers 40. In particular, the previously melted securing portions 44 solidify again to provide this securing. The securing portions 44 thus constitute portions where the bonding fibers 40 and the discrete structural elements 38 are attached.

Following the sixth step 160, the remainder of the body 24 is overmolded on the portion 34, for example.

The mold is then opened and the assembly comprising the body 24, and covering 27, if applicable, is demolded.

If necessary, the protective layer 26 is then glued to the body 24.

The assembly comprising the body 24 and, if applicable, the protective layer 26, the covering 27 and the comfort layer 28 are then attached to the frame 22 so that the protective layer 26 extends between the body 24 and the frame 22.

According to another variant, the body 24 is formed entirely of discrete structural elements 38 and bonding fibers 40.

According to another variant, the portion of the body 24 in contact with the covering 27 and, if applicable, the comfort layer 28 is formed of discrete structural elements 38 and bonding fibers 40. Said portion of the body 24 is the portion 34 of the body 24 comprising the discrete structural elements 38 and the bonding fibers 40, for example. According to this variant, the body 24 is fixed with the covering 27, and, if applicable, with the comfort layer 28, via the bonding fibers 40. The bonding fibers 40 thus allow the body 24 and the covering 27 and, if applicable, the comfort layer 28 to secure well together. When the support element 12 comprises the securing layer, the bonding fibers 40 bind the body 24 and the securing layer, for example. Thus, securing of the body 24 to the covering 27 and comfort layer 28, if applicable, is accomplished during the mold heating step, followed by the mold cooling step. The securing portions 44 melt and re-solidify, to ensure the securing of the discrete structural elements 38 to the covering 27 and the comfort layer 28, if applicable.

According to yet another embodiment, a portion of the body 24 different from the portion 34 may be made of thermosetting foam, for example, following a conventional molding of thermosetting foam precursor material. The thermosetting foam is PU foam, for example. Advantageously, this foam part is overmolded on the portion 34.

According to yet another variant, the support element 12 further comprises a thermo-bonding layer, connected to the protective layer 26. The thermo-bonding layer is a heat-activated securing layer. The thermo-bonding layer ensures the securing between the protective layer 26 and the body 24. During the manufacturing method, the protective layer 26 is then applied to the manufacturing assembly in the mold after the manufacturing assembly is blown. The thermo-bonding layer is then activated by heat activation, particularly during the heating step of the manufacturing method for the support element 12. The thermo-bonding layer then attaches together the protective layer 26 and the body 24.

According to another variant, the comfort layer 28 is made of a textile. During the manufacturing method, the comfort layer 28 is then woven onto the covering 27.

According to another variant, the comfort layer 28 is mechanically attached to the covering 27 with a plastic clip, hook, or hanging loops, for example.

According to another variant, the comfort layer 28 is glued to the covering 27. For example, the comfort layer 28 is glued to the covering 27 by means of a thermally activated securing layer. The securing is performed during the heating step of the method for manufacturing the support element 12, for example.

The seat support element 10 allows for effective body cohesion while providing accurate modulation of the body reinforcement 24.

In addition, the seat support element 10 has a reduced environmental impact. The use of discrete structural elements 38 bonded together by bonding fibers 40 to make the body 24 offers alternatives to conventional molding from raw thermoset foam.

The invention claimed is:

1. A support element for a seat of a vehicle comprising a body, wherein the body comprises at least one portion comprising a plurality of discrete structural elements and a plurality of bonding fibers, the discrete structural elements being joined together via the bonding fibers to form the portion of the body,
   wherein the bonding fibers are directly fixed to the discrete structural elements.

2. The support element according to claim 1, wherein the discrete structural elements are formed by a structural material made of foam and/or structural fibers and/or textile.

3. The support element according to claim 2, wherein the bonding fibers comprise a central core and an integral sheath covering the core, the sheath being made of a material that melts when subjected to a melting temperature, and the bonding fibers being directly fixed to the discrete structural elements by the sheath.

4. The support element according to claim 3, wherein the sheath comprises at least one securing portion attached to at least one discrete structural element and/or at least one other bonding fiber.

5. The support element according to claim 3, wherein the structural fibers are formed by a bare core, the bare core not melting when subjected to the melting temperature.

6. The support element according to claim 2, wherein the bonding fibers and/or the structural fibers are thermoplastic fibers.

7. The support element according to claim 6, wherein the bonding fibers and/or the structural fibers are fibers made of polyethylene.

8. The support element according to claim 6, wherein the bonding fibers and/or the structural fibers are fibers made of polyethylene terephthalate.

9. The support element according to claim 2, wherein the discrete structural elements are formed by the structural material that is cut and crushed.

10. The support element according to claim 1, wherein the body is formed entirely of discrete structural elements and bonding fibers.

11. The support element according to claim 1, further comprising a frame, the body being connected to the frame, and at least one protective layer for protecting the body extending between the body and the frame.

12. The support element according to claim 1, the body defining a bearing surface, the seat support element further comprising a comfort layer extending over the bearing surface and being intended to be interposed between a user of the seat and the bearing surface.

13. A vehicle seat comprising a support element according to claim 1, the support element being a seat cushion, a backrest or a headrest of the seat.

14. The support element according to claim 1, further comprising:
   a frame, the body being connected to the frame,
   the at least one portion of the body comprising the plurality of discrete structural elements and the plurality of bonding fibers being in direct contact with the frame,
   said at least one portion of the body being overmolded by another portion of the body made with a thermosetting foam, and
   said another portion of the body forming at least a portion of a bearing surface of the support element which a user bears on when sitting in the seat.

15. The support element according to claim 1, wherein the body defines a bearing surface, the seat support element further comprising a comfort layer extending over the bearing surface and being configured to be interposed between a user of the seat and the bearing surface, the at least one portion of the body comprising the plurality of discrete structural elements and the plurality of bonding fibers being in contact with the comfort layer, the body being fixed to the comfort layer via the bonding fibers.

16. A method for manufacturing a seat support element of a vehicle, the support element comprising a body, the body comprising at least one portion comprising a plurality of discrete structural elements and a plurality of bonding fibers, the method comprising:
   providing the discrete structural elements and the bonding fibers,
   mixing the discrete structural elements and the bonding fibers to form a manufacturing assembly,
   shaping the manufacturing assembly so that it takes the shape of at least a portion of the body, and
   securing the discrete structural elements to each other via the bonding fibers.

17. The method according to claim 16, wherein the discrete structural elements are formed by a structural material made of foam and/or structural fibers and/or textile, wherein the bonding fibers and/or structural fibers are thermoplastic fibers.

18. The method according to claim 17, wherein the bonding fibers and/or structural fibers are fibers made of polyethylene terephthalate.

19. The method according to claim 16, wherein the bonding fibers comprise a central core and a sheath covering the core, the sheath being made of a material that melts when subjected to a melting temperature, the securing of the discrete structural elements to each other comprising arranging the manufacturing assembly in a mold and:

pressing the manufacturing assembly into the mold, heating the manufacturing assembly in the mold to the melting temperature to melt the bonding fiber sheath at least partially, and cooling the manufacturing assembly so that the discrete structural elements are secured to each other via the bonding fibers.

20. A support element for a seat of a vehicle, comprising:

a frame, a body connected to the frame, and at least one protective layer extending between the body and the frame for protecting the body, wherein the body comprises at least one portion comprising a plurality of discrete structural elements and a plurality of bonding fibers, the discrete structural elements being joined together via the bonding fibers to form the portion of the body.

* * * * *